US011623982B2

(12) United States Patent
Chen et al.

(10) Patent No.: US 11,623,982 B2
(45) Date of Patent: Apr. 11, 2023

(54) ETHYLENE/ALPHA OLEFIN INTERPOLYMER COMPOSITIONS WITH IMPROVED CONTINUOUS HIGH TEMPERATURE RESISTANCE

(71) Applicant: Dow Global Technologies LLC, Midland, MI (US)

(72) Inventors: Yong Chen, Shanghai (CN); Bo Lyu, Shanghai (CN); Tao Han, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/970,282

(22) PCT Filed: Feb. 14, 2018

(86) PCT No.: PCT/CN2018/076786
§ 371 (c)(1),
(2) Date: Aug. 14, 2020

(87) PCT Pub. No.: WO2019/157688
PCT Pub. Date: Aug. 22, 2019

(65) Prior Publication Data
US 2021/0079201 A1    Mar. 18, 2021

(51) Int. Cl.
| | | |
|---|---|---|
| *C08L 23/16* | (2006.01) | |
| *C08K 3/04* | (2006.01) | |
| *C08K 5/14* | (2006.01) | |
| *C08K 5/18* | (2006.01) | |
| *C08K 3/22* | (2006.01) | |
| *C08L 23/08* | (2006.01) | |

(52) U.S. Cl.
CPC .......... *C08L 23/0815* (2013.01); *C08L 23/16* (2013.01); *C08K 3/04* (2013.01); *C08K 5/14* (2013.01); *C08K 5/18* (2013.01); *C08K 2003/222* (2013.01)

(58) Field of Classification Search
None
See application file for complete search history.

(56) References Cited

U.S. PATENT DOCUMENTS

| | | | |
|---|---|---|---|
| 4,877,817 A | | 10/1989 | Tojo et al. |
| 6,047,740 A | * | 4/2000 | Ikeda ...................... C08K 3/22 |
| | | | 138/177 |
| 6,171,671 B1 | | 1/2001 | Nakano et al. |
| RE37,527 E | | 1/2002 | Hakuta et al. |
| 6,506,827 B2 | | 1/2003 | Nakano |
| 7,055,552 B2 | | 6/2006 | Hirai et al. |
| 9,580,587 B2 | | 2/2017 | Clayfield et al. |
| 10,975,233 B2 | | 4/2021 | Kanuteh et al. |
| 11,078,352 B2 | | 8/2021 | Ichino et al. |
| 2001/0031916 A1 | | 10/2001 | Bennett et al. |
| 2008/0188600 A1 | * | 8/2008 | Westwood .............. C08L 23/16 |
| | | | 524/81 |
| 2012/0252917 A1 | | 10/2012 | Kisin et al. |
| 2014/0287178 A1 | * | 9/2014 | Clayfield .................. F16L 9/14 |
| | | | 428/36.9 |

FOREIGN PATENT DOCUMENTS

| | | |
|---|---|---|
| CA | 1334694 C | 3/1995 |
| CN | 106117823 A | 11/2016 |
| CN | 108164837 A | 6/2018 |
| EP | 101175 A1 | 2/1984 |
| EP | 1433812 A1 | 6/2004 |
| EP | 1676879 A2 | 7/2006 |
| JP | S6027129 B2 | 6/1985 |
| JP | 2001294715 A | 10/2001 |
| JP | 2006199901 A1 | 8/2006 |
| WO | 2012/147386 A1 | 11/2012 |
| WO | 2019/157687 A1 | 8/2019 |
| WO | 2019/161013 A1 | 8/2019 |

OTHER PUBLICATIONS

Dekmezian, "Compatibilzation of CR/EPM blends for power transmission belt application," Rubber World, Feb. 1997, p. 1-9.
Dominic K. and Kothari, V., "Overview of Automotive Wire and Cable and Recent Advances," ACS Rubber Division Spring Technical Meeting, 1998, Paper No. 32.
Ferradino, A. "Antioxidant Selection for Peroxide Cure Elastomer applications" Rubber Chemistry and Technology, vol. 76, pp. 704 (2003).
Ohm, B. et al., "Optimizing the Heat Resistance of EPDM and NBR," ACS Rubber Division Fall technical meeting, 2000, Paper No. 99.
School, R. "Elastomer Section" Rubber Technology: Compounding and Testing for Performance, Chapter 6, 2009, Hanser.
Sinha, D.P. et al, "Cure, antidegradant use better hose, belt compounds", Rubber News (Jun. 2001).
Tao, Z. et al., "Heat Resistant Elastomers", Rubber Chemistry and Technology, V 78, pp. 489, 2005.
PCT/CN2018/076786, International Search Report and Written Opinion dated Nov. 21, 2018.
F. Gugumus, "Advances in the Stabilization of Polyolefins" Polymer Degradation and Stability, 24, 289-301, 1989.

* cited by examiner

*Primary Examiner* — Richard A Huhn

(57) ABSTRACT

A composition comprising the following components: A) an ethylene/alpha-olefin/diene interpolymer with MV (1+4, 125° C.)≥50; B) an ethylene/alpha-olefin copolymer with MV (1+4, 125° C.)<70; C) MgO; D) at least one carbon black filler; E) at least one hindered amine antioxidant; F) at least one peroxide.

18 Claims, No Drawings

ETHYLENE/ALPHA OLEFIN INTERPOLYMER COMPOSITIONS WITH IMPROVED CONTINUOUS HIGH TEMPERATURE RESISTANCE

BACKGROUND OF THE INVENTION

Automotive Under-The-Hood (UTH) products, such as hoses, belts, seals/gaskets, mufflers and exhaust hangers can be manufactured from EPDM rubber formulations. The formulations should provide acceptable physical properties after vulcanization. For a radiator coolant hose, a good balance of the high temperature (heat aging), and a TR10—low temperature retraction performance, is needed. In recent years, the development of compact and sophisticated engine compartment designs have raised the standards for long term heat aging performance of hoses and other products. As an example, certain standards require a good retention of mechanical properties, after long term hot air aging (Tensile Strength ≥7.5 MPa and Elongation ≥165% at 1008 hours/150° C.), as well as good low temperature elasticity (TR10≤−38° C.). Moreover, the rubber formulation cannot contain additives, and/or byproducts of the same, that cause strong odors, during the engine operation, and/or leach out into the engine coolant.

Rubber formulations are described in the following references: U.S. Pat. Nos. 6,506,827, 7,055,552, 6,171,671, 6,047,740, U.S. RE37527(E), International Publication WO 2012/147386, JP2001294715A (Abstract), and CN106117823A (Abstract); EP101175B1; EP1433812A1; EP1676879A2; CA1334694C; D. P. Sinha et al, "Cure, antidegradant use better hose, belt compounds", Rubber News (June, 2001); K. Dominic et al, "Overview of Automotive Wire and Cable and Recent Advances," ACS Rubber Division Spring Technical Meeting, 1998, Paper No. 32; "Rubber Technology: Compounding and Testing for Performance" by John Dick, Chapter 6, "Elastomer Selection," (2009, Hanser); Anthony G. Ferradino, Rubber Chemistry and Technology, Vol. 76, pp 704 (2003); P. Arjunan et al, "Compatibilzation of CR/EPM blends for power transmission belt application" Rubber World, (February, 1997); Z. Tao, et al, "Heat Resistant Elastomers", Rubber Chemistry and Technology (2005, V 78, pp 489); R. Ohm, et al., "Optimizing the Heat Resistance of EPDM and NBR," ACS Rubber Division Fall technical meeting, 2000, Paper No. 99.

However, there remains a need for rubber formulations that have improved retention of mechanical properties and elasticity, after a long term exposure to hot air. There is a further need for such formulations that are well suited for use in compact engine designs. These needs have been met by the following invention.

SUMMARY OF THE INVENTION

A composition comprising the following components:
A) an ethylene/alpha-olefin/diene interpolymer with MV(1+4, 125° C.)≥50;
B) an ethylene/alpha-olefin copolymer with MV(1+4, 125° C.)≤80;
C) MgO;
D) at least one carbon black filler;
E) at least one hindered amine antioxidant;
F) at least one peroxide.

DETAILED DESCRIPTION

A composition comprising the following components:
A) an ethylene/alpha-olefin/diene interpolymer with MV(1+4, 125° C.)≥50, or ≥55, or ≥60, or ≥65, or ≥70, or ≥75, or ≥80, or ≥85;
B) an ethylene/alpha-olefin copolymer with MV(1+4, 125° C.)≤80;
C) MgO;
D) at least one carbon black filler;
E) at least one hindered amine antioxidant;
F) at least one peroxide.

It has been discovered that the above compositions afford excellent physical properties of the final crosslinked composition, including excellent physical properties before, and after, long term aging in air. Such compositions are well suited for radiator and heater coolant hoses or other engine parts found in compact engine designs.

The composition may comprise one or more embodiments described herein. Component A may comprise one or more embodiments described herein. Component B may comprise one or more embodiments described herein. Component C may comprise one or more embodiments described herein. Component D may comprise one or more embodiments described herein. Component E may comprise one or more embodiments described herein. Component E may comprise one or more embodiments described herein.

In one embodiment or a combination of embodiments described herein, the ethylene/alpha-olefin/diene interpolymer of component A has a density from 0.850 to 0.880 g/cc, or from 0.855 to 0.875 g/cc, or from 0.860 to 0.870 g/cc (1 cc=1 cm$^3$).

In one embodiment or a combination of embodiments described herein, the ethylene/alpha-olefin copolymer of component B has a density from 0.850 to 0.880 g/cc, or from 0.855 to 0.875 g/cc, or from 0.860 to 0.870 g/cc (1 cc=1 cm$^3$).

In one embodiment or a combination of embodiments described herein, the weight ratio of component D to component C is from 2.0 to 50, or from 2.5 to 30, or from 3.0 to 20, or from 3.5 to 15, or from 4.0 to 10.

In one embodiment or a combination of embodiments described herein, the weight ratio of component A to component B is from 0.2 to 5.0, or from 0.3 to 4.0, or from 0.4 to 3.0, or from 0.5 to 2.5, of from 0.6 to 2.0.

In one embodiment or a combination of embodiments described herein, the weight ratio of component C to component E is from 0.5 to 30.0, or from 1.0 to 20.0, or from 1.5 to 15.0, or from 2.0 to 10.0.

In one embodiment, or a combination of embodiments described herein, component A is present in an amount from 5.0 wt % to 50 wt %, or from 10 wt % to 40 wt %, or from 15 wt % to 35 wt %, or from 20 wt % to 30 wt % based on the weight of the composition.

In one embodiment or a combination of embodiments described herein, the ethylene/alpha-olefin/diene interpolymer of component A is an EPDM.

In one embodiment, or a combination of embodiments described herein, the ethylene/alpha-olefin/diene interpolymer of component A has a "% Peak Area (21.3 ppm to 22.0 ppm)"≥3.0%, or ≥5.0%, or ≥7.0%, or ≥10%, or ≥12%, or ≥14%, or ≥16%, or ≥18%, or ≥20%, as determined by 13C NMR (propylene tacticity marker). In one embodiment, or a combination of embodiments described herein, the ethylene/alpha-olefin/diene interpolymer of component A has a "%

Peak Area (21.3 ppm to 22.0 ppm)"≤40%, or ≤35%, or ≤30%, as determined by 13C NMR (propylene tacticity marker).

In one embodiment, or a combination of embodiments described herein, component B is present in an amount from 5 wt % to 50 wt %, or from 10 wt % to 40 wt %, or from 15 wt % to 35 wt %, or from 20 wt % to 30 wt % based on the weight of the composition.

In one embodiment or a combination of embodiments described herein, the alpha-olefin of the ethylene/alpha-olefin copolymer" of component B is a C3-C10 alpha-olefin, and further a C4-C8 alpha-olefin.

In one embodiment, or a combination of embodiments described herein, the ethylene/alpha-olefin copolymer of component B has a PRR value ≥4.0, or ≥5.0, or ≥6.0, or ≥7.0, or ≥8.0 or ≥9.0, or ≥10.0; where PRR=RR+[3.82−interpolymer Mooney Viscosity ($ML_{1+4}$ at 125° C.)]×0.3, and where RR (Rheology Ratio)=$V_{0.1}/V_{100}$, and $V_{0.1}$ is the viscosity at 0.1 rad/sec and 190° C., and $V_{100}$ is the viscosity at 100 rad/sec and 190° C. In one embodiment, or a combination of embodiments described herein, the ethylene/alpha-olefin copolymer of component B has a PRR value≤80, or ≤70, or ≤60, or ≤50, or ≤40 or ≤30. See International Publication WO00/26268.

In one embodiment or a combination of embodiments described herein, the ethylene/alpha-olefin copolymer" of component B is selected from ethylene/octene copolymer, ethylene/hexene copolymer or ethylene/butene copolymer.

In one embodiment or a combination of embodiments described herein, the sum weight of component A and component B is present in an amount from 30 wt % to 70 wt %, based on the weight of the composition.

In one embodiment or a combination of embodiments described herein, the MgO of component C is present in an amount from 0.5 to 10 wt %, based on the weight of the composition.

In one embodiment or a combination of embodiments described herein, component E is present in an amount from 0.1 to 3.0 wt %, based on the weight of the composition.

In one embodiment or a combination of embodiments described herein, the hindered amine of component E is selected from the following structure A.

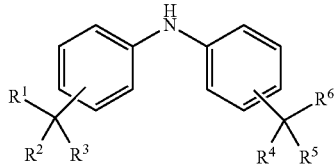

Structure A, where R1, R2, R3, R4, R5, and R6 are each, independently, selected from H; an aliphatic hydrocarbon group; a substituted aliphatic hydrocarbon group; an aromatic group; a substituted aromatic group; a thiol group; an amino group; a hydroxyl group; —(OCH$_2$CH$_2$)$_n$OH, where n is from 1 to 100, or —(OCH(CH$_3$)CH$_2$)$_n$OH, where n is from 1 to 100. As used herein, a substituted aliphatic hydrocarbon group is an aliphatic hydrocarbon group that is substituted with at least one chemical group that contains an heteroatom (for example, O, N, F). As used herein, a substituted aromatic group is an aromatic group that is substituted with at least one chemical group that contains an heteroatom (for example, O, N, F). Note, R1=R$^1$, R2=R$^2$, and so forth.

In one embodiment or a combination of embodiments described herein, in regard to Structure A, R1, R2, R3, R4, R5, and R6 are each, independently, selected from H; an aliphatic hydrocarbon group; an aromatic group; a thiol group; an amino group; a hydroxyl group; —(OCH$_2$CH$_2$)$_n$OH, where n is from 1 to 100, or a —(OCH(CH$_3$)CH$_2$)$_n$OH, where n is from 1 to 100.

In one embodiment or a combination of embodiments described herein, in regard to Structure A, R1, R2, R3, R4, R5, and R6 are each, independently, selected from H; a C1-C8 aliphatic hydrocarbon group; an aromatic group; a thiol group; an amino group; a hydroxyl group; —(OCH$_2$CH$_2$)$_n$OH, where n is from 1 to 100, or a —(OCH(CH$_3$)CH$_2$)$_n$OH, where n is from 1 to 100.

In one embodiment or a combination of embodiments described herein, in regard to Structure A, R1, R2, R3, R4, R5, and R6 are each, independently, selected from H; a C1-C8 alkyl group; an aromatic group; a thiol group; an amino group; a hydroxyl group; —(OCH$_2$CH$_2$)$_n$OH, where n is from 1 to 100, or —(OCH(CH$_3$)CH$_2$)$_n$OH, where n is from 1 to 100.

In one embodiment or a combination of embodiments described herein, in regard to Structure A, R1, R2, R3, R4, R5, and R6 are each, independently, selected from H; an aliphatic hydrocarbon group; or an aromatic group. In a further embodiment, R1=R6, R2=R5, and R3=R4.

In one embodiment, the hindered amine of component E is bis[4-(2-phenyl-2-propyl)-phenyl]amine:

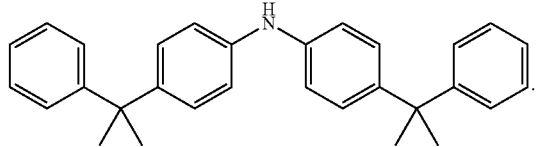

Bis[4-(2-phenyl-2-propyl)phenyl]amine

In one embodiment or a combination of embodiments described herein, component F is present in an amount from 1.0 to 10 wt %, based on the weight of the composition.

In one embodiment or a combination of embodiments described herein, component D is present in an amount from 15 to 50 wt %, based on the weight of the composition.

In one embodiment or a combination of embodiments described herein, component D comprises two samples of carbon black in a total amount from 15 to 50 wt %.

In one embodiment, or a combination of embodiments described herein, component F is present in an amount ≥1.0 wt %, or ≥2.0 wt %, based on the weight of the composition. In one embodiment, or a combination of embodiments described herein, component F is present in an amount ≤10.0 wt %, or ≤5.0 wt %, based on the weight of the composition.

In one embodiment, or a combination of embodiments described herein, the composition further comprises an oil, such as, for example, a paraffinic oil, or a naphthenic oil. In a further embodiment, the oil is present in an amount from 1.0 wt % to 30 wt %, or from 5.0 wt % to 18 wt %, or from 6.0 wt % to 16 wt %, or from 8.0 wt % to 14 wt %, or from 10 wt % to 12 wt % based on the weight of the composition.

In one embodiment or a combination of embodiments described herein, the composition has a Tensile Stress at Break≥9.0 MPa, or ≥9.5 MPa, or ≥10.0 MPa.

In one embodiment or a combination of embodiments described herein, the composition has a Tensile Strain at Break≥200%, or ≥250%, or ≥300%, or ≥350%.

In one embodiment or a combination of embodiments described herein, the composition, after 120 hours at 180° C., in air, retains≥50%, or ≥55%, or ≥60%, or ≥65% of its original Tensile Stress at Break.

In one embodiment or a combination of embodiments described herein, the composition, after 120 hours at 180° C., in air, retains ≥35%, or ≥40%, or ≥45% of its original Tensile Strain at Break.

In one embodiment or a combination of embodiments described herein, the composition, after 120 hours at 180° C., in air, has a TR10 value ≤−30° C., or ≤−32° C., or ≤−35° C., or ≤−38° C., or ≤−40° C.

In one embodiment, or a combination of embodiments described herein, the composition has a Shore A Hardness from 50 degree to 78 degree, of from 55 degree to 75 degree, or from 60 degree to 70 degree.

In one embodiment, or a combination of embodiments described herein, the composition, after 120 hours, at 180° C., in air, has an increase in Shore A Hardness from 5.0% to 20%, of from 6.0% to 15%, or from 7.0% to 14%.

In one embodiment or a combination of embodiments described herein, the composition comprises, based on the weight of the composition, ≤0.010 wt %, or ≤0.005 wt %, or ≤0.001 wt % of a thiol group. In a further embodiment, the composition does not comprise a thiol group.

In one embodiment or a combination of embodiments described herein, the composition comprises, based on the weight of the composition, ≤0.010 wt %, or ≤0.005 wt %, or ≤0.001 wt % of a carboxylic acid ester group. In a further embodiment, the composition does not comprise a carboxylic acid ester group.

In one embodiment or a combination of embodiments described herein, the composition comprises, based on the weight of the composition, ≤0.010 wt %, or ≤0.005 wt %, or ≤0.001 wt % of a phenolic hydroxyl group. In a further embodiment, the composition does not comprise a phenolic hydroxyl group.

In one embodiment or a combination of embodiments described herein, the composition comprises, based on the weight of the composition, ≤0.010 wt %, or ≤0.005 wt %, or ≤0.001 wt % of an acyl group. In a further embodiment, the composition does not comprise an acyl group.

In one embodiment or a combination of embodiments described herein, the composition comprises, based on the weight of the composition, ≤0.010 wt %, or ≤0.005 wt %, or ≤0.001 wt % of a metal thiocarbamate (for example, nickel diisobutyldithiocarbamate). In a further embodiment, the composition does not comprise a metal thiocarbonate group.

In one embodiment or a combination of embodiments described herein, the composition comprises, based on the weight of the composition, ≤0.010 wt %, or ≤0.005 wt %, or ≤0.001 wt % of ZnO. In a further embodiment, the composition does not comprise ZnO.

In one embodiment or a combination of embodiments described herein, the composition comprises, based on the weight of the composition, ≤0.010 wt %, or ≤0.005 wt %, or ≤0.001 wt % of dicumyl peroxide (DCP). In a further embodiment, the composition does not comprise DCP.

In one embodiments or a combination of embodiments described herein the composition comprises, the following:
an EPDM (component A) with high Mooney viscosity ≥50 MV and an ethylene content ≤70 wt % (based on the weight of the EPDM); and further at a loading level from 10 to 90 phr, or from 20 to 80 phr, based on 100 parts of the sum of component A and component B;

an ethylene/alpha-olefin copolymer (component B), for example, ethylene-butene copolymer, ethylene-hexene copolymer, ethylene-octene copolymer, with a Mooney viscosity ≤80 MV; and further at a loading level from 10 to 90 phr, or from 20 to 80 phr, based on 100 parts of the sum of component A and component B;

at least one carbon black (component D), and further at a loading level from 10 to 100 phr, or from 15 to 80 phr, or from 20 to 60 phr, based on 100 parts of the sum of component A and component B;

at least one plasticizers, such as paraffinic oil and naphthenic oil; and further at a loading level from 10 to 60 phr, or from 15 to 40 phr, based on 100 parts of the sum of component A and component B;

at least one hindered amine antioxidant (component E); and further at a loading level from 0.5 to 5 phr, or from 1 to 4 phr, or from 1 to 3 phr, based on 100 parts of the sum of component A and component B;

magnesium oxide (MgO) (component C), and further at a loading level from 1 to 15 phr, or from 2 to 10 phr, based on 100 parts of the sum of component A and component B;

at least one crosslinking agent (component F), such "non DCP type" peroxides (for example, [di(tert-butylperoxyisopropyl) benzene], [2,5-dimethyl-2,5-di(tert-butylperoxy) hexane]; and further at a loading level from 2 to 6 phr, or from 3 to 5 phr, based on 100 parts of the sum of component A and component B;

at least one coagent (such as TAIC); and further at a loading level from 0.5 to 5 phr, or from 1 to 4 phr, or from 1 to 3 phr, based on 100 parts of the sum of component A and component B;

at least one processing aid, such as a fatty acid, a metal salt of a fatty acid and a fatty acid ammines, PEG; and further at a loading level from 0.5 to 6 phr, or from 1 to 4 phr, based on 100 parts of the sum of component A and component B;

optional silica, such as vinyl silane, and further at a loading level from 0.5 to 80 phr, or from 1 to 60 phr, or from 1 to 40 phr, based on 100 parts of the sum of component A and component B;

optional coupling agent, such as vinyl silane; and further at a loading level from 0.5 to 10 phr, or from 1 to 5 phr, or from 1 to 3 phr, based on 100 parts of the sum of component A and component B;

optional fillers, such as talc and $CaCO_3$.

Also is provided a crosslinked composition comprising the composition one or more embodiments described herein.

Also is provided an article comprising at least one component formed from the composition of one or more embodiments described herein.

In one embodiment, or a combination of embodiments described herein, the article is selected from the group consisting of the following: injection molded parts, foams, automotive parts, building and construction materials, building and construction materials, and shoe components. In one embodiment, or a combination of embodiments described herein, the article is selected from the group consisting of the following: hoses, belts, and gaskets.

An inventive article may comprise a combination of two or more embodiments as described herein.

Some embodiments are as follows.

a) As discussed above, a composition is provided that comprises the following components:
A) an ethylene/alpha-olefin/diene interpolymer with MV(1+4, 125° C.)≥50;

B) an ethylene/alpha-olefin copolymer with MV(1+4, 125° C.)≤80;
C) MgO;
D) at least one carbon black filler;
E) at least one hindered amine antioxidant;
F) at least one peroxide.

b) The composition of a) above, wherein the weight ratio of component D to component C is from 2.0 to 20.

c) The composition of a) or b) above, wherein the weight ratio of component A to component B is from 0.2 to 4.0.

d) The composition of anyone of a)-c) above, wherein the weight ratio of component C to component E is from 1.0 to 10.

e) The composition of anyone of a)-d) above, wherein the ethylene/alpha-olefin copolymer of component B has a density from 0.850 g/cc to 0.880 g/cc.

f) The composition of anyone of a)-e) above, wherein the ethylene/alpha-olefin/diene interpolymer is an EPDM.

g) The composition of anyone of a)-f) above, wherein the sum weight of component A and component B is present in an amount from 30 wt % to 70 wt %, based on the weight of the composition.

h) The composition of anyone of a)-g) above, wherein the alpha-olefin of the ethylene/alpha-olefin copolymer" of component B is a C3-C10 alpha-olefin.

i) The composition of h) above, wherein the alpha-olefin of the ethylene/alpha-olefin copolymer is a C4-C8 alpha-olefin.

j) The composition of anyone of a)-i) above, wherein the MgO of component C is present in an amount from 0.5 to 10 wt %, based on the weight of the composition.

k) The composition of anyone of a)-j) above, wherein component E is present in an amount from 0.1 to 3.0 wt %, based on the weight of the composition.

l) The composition of anyone of a)-k) above, wherein component F is present in an amount from 1.0 to 10 wt %, based on the weight of the composition.

m) The composition of anyone of a)-l) above, wherein component D is present in an amount from 15 to 40 wt %, based on the weight of the composition.

n) The composition of anyone of a)-m), wherein the composition comprises ≥0.5 wt % of a curing co-agent, based on the weight of the composition.

o) The composition of any of a)-n) above, wherein the composition further comprises an oil.

p) The composition of o) above, wherein the oil is present in an amount from 4.0 wt % to 20 wt %, based on the weight of the composition.

q) The composition of anyone of a)-p), wherein the composition has a Tensile Stress at Break ≥9.0 MPa, or ≥9.5 MPa, or ≥10.0 MPa.

r) The composition of anyone of a)-q) above, wherein the composition has a Tensile Strain at Break ≥200%, or ≥250%, or ≥300%, or ≥350%.

s) The composition of any one of a)-r) above, wherein the composition, after 120 hours at 180° C., in air, retains ≥50%, or ≥55%, or ≥60%, or ≥65% of its original Tensile Stress at Break.

t) The composition of any one of a)-s) above, wherein the composition, after 120 hours at 180° C., in air, retains ≥35%, or ≥40%, or ≥45% of its original Tensile Strain at Break.

u) The composition of any one of a)-t) above, wherein the composition, after 120 hours at 180° C., in air, has a TR10 value ≤−30° C., or ≤−32° C., or ≤−35° C., or ≤−38° C., or ≤−40° C.

v) A crosslinked composition comprising the composition of any one of a)-u) above.

w) An article comprising at least one component formed from the composition of anyone of a)-v) above.

Component A

The ethylene/α-olefin/diene interpolymer of component A comprises, in polymerized form, ethylene, an α-olefin, and a diene. The α-olefin may be either an aliphatic or an aromatic compound. In an embodiment, the α-olefin is a C3-C20 aliphatic compound, preferably a $C_3$-$C_{16}$ aliphatic compound, and more preferably a $C_3$-$C_{10}$ aliphatic compound. Preferred $C_3$-$C_{10}$ aliphatic α-olefins are selected from the group consisting of propylene, 1-butene, 1-hexene and 1-octene, and more preferably propylene.

Suitable examples of dienes include the $C_4$-$C_{40}$ nonconjugated dienes. Illustrative nonconjugated dienes include straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In an embodiment, the diene is a nonconjugated diene selected from the group consisting of ENB, dicyclopentadiene, 1,4-hexadiene, 7-methyl-1,6-octadiene. In embodiments, the diene is ENB.

In one embodiment, or a combination of embodiments described herein, each ethylene/α-olefin/diene interpolymer, independently, comprises a majority amount of polymerized ethylene, based on the weight of the interpolymer.

In one embodiment, or a combination of embodiments described herein, each ethylene/α-olefin/diene interpolymer is an ethylene/α-olefin/diene terpolymer (EAODM). In a further embodiment, the interpolymer is an ethylene/propylene/diene terpolymer (EPDM) terpolymer. In a further embodiment, the diene is 5-ethylidene-2-norbornene (ENB).

An ethylene/α-olefin/nonconjugated diene interpolymer may comprise a combination of two or more embodiments described herein. An EPDM terpolymer may comprise a combination of two or more embodiments as described herein.

In an embodiment, or a combination of embodiments described herein, the ethylene/alpha-olefin/diene interpolymer of component A comprises an amount of ethylene from 35 to 70 wt %, or from 40 to 55 wt %, or from 45 to 50 wt %, based on the weight of the interpolymer.

In an embodiment, or a combination of embodiments described herein, the ethylene/alpha-olefin/diene interpolymer of component A comprises an amount of diene of from 0.1 to 10.0 wt %, or from 0.5 to 8.0 wt %, based on the weight of the interpolymer.

In an embodiment, or a combination of embodiments described herein, the ethylene/alpha-olefin interpolymer of component A has a weight average molecular weight (Mw (conv))≥150,000, or ≥160,000, or ≥170,000, or ≥180,000, or ≥190,000, or ≥200,000 or ≥210,000, or ≥220,000, or ≥230,000 g/mol. In an embodiment, or a combination of embodiments described herein, the ethylene/alpha-olefin interpolymer of component A has a weight average molecular weight (Mw)≤600,000, or ≤500,000, or ≤400,000, or ≤350,000, or ≤300,000, g/mol.

In one embodiment, or a combination of embodiments described herein, the ethylene/alpha-olefin interpolymer of component A has a molecular weight distribution (Mw(conv)/Mn(conv))≥2.10, or ≥2.50, or ≥3.50, or ≥4.00, or ≥4.20, or ≥4.40, or ≥4.50. In an embodiment, or a combination of embodiments described herein, the least one ethylene/alpha-olefin inter-polymer of component A has a molecular weight distribution (Mw(conv)/Mn(conv))≤6.50, or ≤6.20≤6.10, or ≤6.00.

In one embodiment, or a combination of embodiments described herein, the ethylene/alpha-olefin inter-polymer of component A has a "% Peak Area (21.3 ppm, to 22.0 ppm)"≥3.0%, or ≥5.0%, or ≥7.0%, or ≥10%, or ≥12%, or ≥14%, or ≥16%, or ≥18%, or ≥20%, as determined by 13C NMR (propylene tacticity marker). In one embodiment, or a combination of embodiments described herein, the ethylene/alpha-olefin inter-polymer of component A has a "% Peak Area (21.3 ppm to 22.0 ppm)"≤40%, or ≤35%, or ≤30%, as determined by 13C NMR (propylene tacticity marker).

In one embodiment, or a combination of embodiments described herein, the ethylene/alpha-olefin interpolymer of component A has a Mooney viscosity (ML(1+4) at 125° C.)≥10, or ≥15, or ≥20, or ≥25, or ≥30, or ≥35. In one embodiment, or a combination of embodiments described herein, the ethylene/alpha-olefin inter-polymer of component A has a Mooney viscosity (ML(1+4) at 125° C.)≤100, or ≤90, or ≤80, or ≤70. Mooney viscosity is that of the interpolymer without a filler and without oil unless otherwise noted.

In an embodiment, or a combination of embodiments described herein, the ethylene/alpha-olefin inter-polymer of component A has a tan delta (0.1 rad/sec, 190° C.) value ≤1.5, or ≤1.25, or ≤1.00. In one embodiment, or a combination of embodiments described herein, the ethylene/alpha-olefin inter-polymer of component A has a tan delta (0.1 rad/sec, 190° C.) value ≥0.50 or ≥0.60, or ≥0.70, or ≥0.80.

In an embodiment, or a combination of embodiments described herein, the ethylene/alpha-olefin inter-polymer of component A has a viscosity (V0.1 rad/sec, 190° C.) of ≥50,000, or ≥60,000, or ≥70,000, or ≥80,000, or ≥90,000, or ≥150,000, or ≥175,000, or ≥200,000. In an embodiment, or a combination of embodiments described herein, the ethylene/alpha-olefin inter-polymer of component A has a viscosity (V0.1 rad/sec, 190° C.) of ≤500,000, or ≤450,000, or ≤400,000, or ≤350,000, or ≤300,000, or ≤200,000, or ≤150,000, or ≤120,000, or ≤110,000.

In one embodiment, or a combination of embodiments described herein, the ethylene/alpha-olefin inter-polymer of component A has a viscosity ratio (V0.1 rad/sec, 190° C./V100 rad/sec, 190° C.) from 20 to 115, or from 25 to 110, or from 30 to 105, or from 35 to 100, or from 40 to 95.

In one embodiment, or a combination of embodiments described herein, the ethylene/alpha-olefin inter-polymer of component A has a density of ≤0.890, or ≤0.880, or ≤0.875, or ≤0.870, or ≤0.865 g/cc. In one embodiment, or a combination of embodiments described herein, the ethylene/alpha-olefin inter-polymer of component A has a density of ≥0.850 g/cc. or ≥0.855 g/cc (1 cc=1 cm$^3$).

The ethylene/alpha-olefin interpolymer of component A of may comprise a combination of two or more embodiments described herein.

Component B

The ethylene/α-olefin copolymer of component B comprises, in polymerized form, ethylene and an α-olefin. The α-olefin may be either an aliphatic or an aromatic compound. In an embodiment, the α-olefin is a $C_4$-$C_{20}$ aliphatic compound, preferably a $C_4$-$C_{16}$ aliphatic compound, and more preferably a $C_4$-$C_{10}$ aliphatic compound. Preferred $C_4$-$C_{10}$ aliphatic α-olefins are selected from the group consisting of 1-butene, 1-hexene and 1-octene, and more preferably 1-octene.

In an embodiment, or a combination of embodiments described herein, the ethylene/alpha-olefin copolymer of component B has a weight average molecular weight (Mw(conv))≥120,000, or ≥150,000, or ≥170,000, or ≥180,000, or ≥190,000, or ≥200,000 or ≥210,000, or ≥220,000, or ≥230,000 g/mol. In an embodiment, or a combination of embodiments described herein, the ethylene/alpha-olefin copolymer of component B has a weight average molecular weight (Mw)≤600,000, or ≤500,000, or ≤400,000, or ≤350,000, or ≤300,000, g/mol.

In one embodiment, or a combination of embodiments described herein, the ethylene/alpha-olefin copolymer of component B has a molecular weight distribution (Mw(conv)/Mn(conv))≥1.8, or ≥2.0, or ≥2.2, or ≥2.4, or ≥2.6, or ≥2.8, or ≥3.0. In an embodiment, or a combination of embodiments described herein, the least one ethylene/alpha-olefin copolymer of component B has a molecular weight distribution (Mw(conv)/Mn(conv))≤5.0, or ≤4.5≤4.0, or ≤3.5.

In one embodiment, or a combination of embodiments described herein, the ethylene/alpha-olefin copolymer of component B has a Mooney viscosity (ML(1+4) at 125° C.)≥10, or ≥15, or ≥20, or ≥25, or ≥30. In one embodiment, or a combination of embodiments described herein, the ethylene/alpha-olefin inter-polymer of component B has a Mooney viscosity (ML(1+4) at 125° C.)≤80, or ≤70, or ≤55, or ≤50. Mooney viscosity is that of the interpolymer without a filler and without oil unless otherwise noted.

In an embodiment, or a combination of embodiments described herein, the ethylene/alpha-olefin copolymer of component B has a tan delta (0.1 rad/sec, 190° C.) value ≤1.5, or ≤1.25, or ≤1.00. In one embodiment, or a combination of embodiments described herein, the ethylene/alpha-olefin copolymer of component B has a tan delta (0.1 rad/sec, 190° C.) value ≥0.50 or ≥0.60, or ≥0.70, or ≥0.80.

In an embodiment, or a combination of embodiments described herein, the ethylene/alpha-olefin copolymer of component B has a viscosity (V0.1 rad/sec, 190° C.) of ≥50,000, or ≥60,000, or ≥70,000, or ≥80,000, or ≥90,000, or ≥150,000, or ≥175,000, or ≥200,000. In an embodiment, or a combination of embodiments described herein, the ethylene/alpha-olefin copolymer of component B has a viscosity (V0.1 rad/sec, 190° C.) of ≤500,000, or ≤450,000, or ≤400,000, or ≤350,000, or ≤300,000, or ≤200,000, or ≤150,000, or ≤120,000, or ≤110,000.

In one embodiment, or a combination of embodiments described herein, the ethylene/alpha-olefin copolymer of component B has a viscosity ratio (V0.1 rad/sec, 190° C./V100 rad/sec, 190° C.) from 20 to 115, or from 25 to 110, or from 30 to 105, or from 35 to 100, or from 40 to 95.

In one embodiment, or a combination of embodiments described herein, the ethylene/alpha-olefin copolymer of component B has a density of ≤0.890, or ≤0.880, or ≤0.875, or ≤0.870, or ≤0.865 g/cc. In one embodiment, or a combination of embodiments described herein, the ethylene/alpha-olefin copolymer of component B has a density of ≥0.850 g/cc. or ≥0.855 g/cc (1 cc=1 cm$^3$).

The ethylene/alpha-olefin copolymer of component B of may comprise a combination of two or more embodiments described herein.

Additives and Applications

A composition may comprise one or more additives, such as oils, crosslinking (or vulcanizing) agents, fillers, antioxidants, flame retardants, foaming agents, colorants or pigments, and thermoplastic polymers, among others.

In an embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550. An oil may comprise a combination of two or more embodiments as described herein.

Additional additives include, but are not limited to, fillers, flame retardants, colorants or pigments, thermoplastic polymers, and combinations thereof. Such additives can be employed in a desired amount to achieve their desired effect. Suitable fillers include, but are not limited to, clay, talc, or carbon black.

In one embodiment, or a combination of embodiments described herein, the inventive composition further comprises at least one antioxidant. Illustrative antioxidants include, but are not limited to, hindered phenols, bisphenols, and thiobisphenols; and substituted hydroquinones.

In one embodiment, or a combination of embodiments described herein, an inventive composition further comprises a thermoplastic polymer. Illustrative polymers, include, but not limited to, propylene-based polymers, ethylene-based polymers, and olefin multi-block interpolymers. Suitable ethylene-base polymers include, but are not limited to, ethylenepropylene copolymers (EPM), high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

The compositions of the present invention may be used to prepare a variety of articles, or their component parts or portions. The inventive compositions may be converted into a finished article of manufacture by any one of a number of conventional processes and apparatus. Illustrative processes include, but are not limited to, extrusion, calendering, compression molding, injection molding and other typical thermoset material forming processes. Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation. The inventive compositions are especially suitable for use as hose, tube or molding parts for automotive and other vehicles.

Definitions

Unless stated to the contrary, implicit from the context, or customary in the art, all parts and percents are based on weight, and all test methods are current as of the filing date of this disclosure.

The term "composition" and like terms, as used herein, means a mixture or blend of two or more materials which comprise the composition, as well as reaction products and decomposition products formed from the materials of the composition.

The transitional terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

The term "ethylene-based polymer" and like terms, as used herein, refers to a polymer that comprises, in polymerized form, 50 wt % or a majority weight percent of ethylene monomer (based on the weight of the polymer), and optionally may comprise one or more comonomers).

"Ethylene/α-olefin/diene interpolymer" and like terms, as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

"Ethylene/α-olefin olefin/diene terpolymer" and like terms, as used herein, refers to a polymer that comprises, in polymerized form, ethylene, an α-olefin, and a diene, as the only monomer types. In one embodiment, the "ethylene/α-olefin/diene terpolymer" comprises a majority weight percent of ethylene (based on the weight of the terpolymer).

"Ethylene/α-olefin copolymer" and like terms, as used herein, refers to a copolymer that comprises, in polymerized form, 50 wt % or a majority of ethylene, based on the weight of the copolymer, and an α-olefin as the only monomer types.

The term "propylene-based polymer" and like terms, as used herein, refers to a polymer that comprises, in polymerized form, a majority weight percent of propylene monomer (based on the weight of the polymer), and optionally may comprise one or more comonomers).

The term "propylene-based copolymer" and like terms, as used herein, refers to a polymer that comprises, in polymerized form, a majority weight percent of propylene monomer (based on the weight of the copolymer), and a comonomer as the only monomer types.

Test Methods

Gel Permeation Chromatography

The chromatographic system consisted of either a Polymer Laboratories Model PL210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: Mpolyethylene=A×(Mpolystyrene)$^B$, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

Mooney Viscosity

Mooney Viscosity (ML1+4 at 125° C.) of an interpolymer (e.g., ethylene/α-olefin/diene interpolymer, was measured in accordance with ASTM 1646-04, using a large rotor, with a one minute preheat time and a four minute rotor operation time. The instrument was an PRESCOTT Mooney Viscometer.

Mooney Viscosity (ML1+4 at 100° C.) of a composition was measured in accordance with ASTM 1646-04, using a large rotor, with a one minute preheat time and a four minute rotor operation time. The instrument was an PRESCOTT Mooney Viscometer.

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidenenorbornene or dicyclopentadiene content.

13C NMR Method for EPDM Composition Analysis and Tacticity (% mm)

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{1000 - 3*molesP - 7*molesENB}{2}; \quad \text{Eqn. 1}$$

$$molesENB = CH3(13.6 - 14.7 \text{ ppm}); \quad \text{Eqn. 2}$$

$$molesP = CH3(19.5 - 22.0 \text{ ppm}); \quad \text{Eqn. 3}$$

$$\text{mole \% ethylene} = \frac{100*molesE}{molesE + molesP + molesENB}; \quad \text{Eqn. 4}$$

$$\text{mole \% propylene} = \frac{100*molesP}{molesE + molesP + molesENB}; \quad \text{Eqn. 5}$$

$$\text{mole \% ENB} = \frac{100*molesENB}{molesE + molesP + molesENB}; \quad \text{Eqn. 6}$$

$$Wt \text{ \% ethylene} = \quad \text{Eqn. 7}$$
$$\frac{100*\text{mole \% } E*28}{\text{moles \% } E*28 + \text{mole \% } P*42 + \text{mole \% } ENB*120};$$

$$Wt \text{ \% propylene} = \quad \text{Eqn. 8}$$
$$\frac{100*\text{mole \% } P*42}{\text{moles \% } E*28 + \text{mole \% } P*42 + \text{mole \% } ENB*120};$$

$$Wt \text{ \% } ENB = \quad \text{Eqn. 9}$$
$$\frac{100*\text{mole \% } ENB*120}{\text{moles \% } E*28 + \text{mole \% } P*42 + \text{mole \% } ENB*120}$$

Propylene Tacticity % mm Area 13C NMR

The 13C NMR spectral analysis of the EPDM samples was used to quantitate the level of tacticity % mm. The NMR was performed in a "50/50" mixture of tetrachloroethaned-2/orthodichlorobenzene," as described above. An NMR spectral analysis (see above) of the inventive EPDMs displayed a significant "% Peak Area from 21.3 ppm-22.0 ppm [rmmr, mmmr, mmmm]," typically greater than 3.5% of the total integral area from 19.5 ppm to 22.0 ppm. Peak responses in this region typically are related to differences in propylene tacticity (% mm) that have been incorporated into the EPDM. A similar analysis can be done for another type of ethylene/α-olefin/diene interpolymer. Spectral data were referenced to the EEE backbone (three or more repeating units of polymerized ethylene) at 30 ppm.

Tensile Stress-Strain Properties

Tensile properties were measured using specimens which were die cut using a small dog bone shaped micro tensile die, having the dimensions described in ASTM D-1708. The die cut specimens were cut from the compression molded plaques which were prepared as described under the compression molding section (see the Experimental section). Tensile properties (tensile strength and elongation) were measured, at room temperature, following the method ASTM D-412, in the machine direction of an INSTRON MODEL 1122, made by INSTRU-MET.

EXPERIMENTAL

Synthesis of Experimental EPDM—Continuous Solution Polymerization

The interpolymer was produced in a solution polymerization process using a continuous stir-tanked reactor, followed by loop reactor. The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3). Ethylene was introduced in a mixture of a solvent of ISOPAR E (available from ExxonMobil), propylene was introduced and 5-ethylidene-2-norbornene (ENB) was introduced, each forming a reactor feed stream. Catalyst was fed to each the reactor separately, and activated in-situ using co-catalyst 1 and co-catalyst 2.

The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent such as hydrogen. After polymerization, a small amount of water was introduced into the reactor exit stream, as a catalyst kill, and the reactor exit stream was introduced into a flash vessel, in which the solids concentration was increased. A portion of the unreacted monomers, that is, ENB, ethylene, and propylene, and the unused diluent were then collected, and recycled back to the reactor feeds as appropriate. See also U.S. Pat. Nos. 5,977,251 and 6,545,088 for descriptions of reactors.

Monomer feed rate and polymerization temperature and other conditions are listed in below in Table 1A and Table 1B.

TABLE 1A

Reaction Conditions

| Example | Reactor Temp. [deg C.] | Pressure [psig] | Solvent/Ethylene Feed Ratio [lb/lb] | Propylene/Ethylene Feed Ratio [lb/lb] | ENB/Ethylene Feed Ratio [lb/lb] |
|---|---|---|---|---|---|
| EPDM 15A-R1 (first reactor) | 118.8 | 724 | 10.5 | 2.38 | 0.22 |
| EPDM 15A (second reactor) | 135.0 | 725 | 7.4 | 0.91 | 0.10 |

TABLE 1B

Reaction Conditions

| Example | Catalyst | H2 Mol % | C2 Concen. [g/L] | Catalyst Efficiency [lb_poly/lb_metal]*10E6 | Borate/ Cat. Metal Ratio [mol/mol] | Aluminum/Cat. Metal Ratio [mol/mol] |
|---|---|---|---|---|---|---|
| EPDM 15A-R1 (first reactor) | Catalyst-1 | 0.02 | 23.7 | 3.73 | 2.0 | 30.0 |
| EPDM 15A (second reactor) | Catalyst-1 | 0.09 | 7.0 | 0.39 | 2.1 | 30.3 |

Catalyst 1 is [[6′,6′′′-((2R,4S)-pentane-2,4-diylbis(oxy)bis(3-(3,6-di-tert-butyl-9H-carbazol-9-yl)-3′-fluoro-5-(2,4,4-trimethylpentan-2-yl)-[1,1′-biphenyl]-2-ol)]](2-)]-zirconium dimethyl.
Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[(C6F5)4]. Cocatalyst-1 was purchased from Boulder Scientific, and used without further purification.
Cocatalyst-2 (modified methylalumoxane (MMAO)) was purchased from Akzo Nobel, and used without further purification.

Materials and Formulations

Materials used in the formulations are listed in Table 2. Formulations (inventive and comparative) are listed in Tables 3-5.

Preparation of the Formulations (Compositions)

All the samples were mixed with a 2 L Banbury rubber internal mixer at rotor speed 35 rpm. Raw materials were loaded with approximately 70 vol % filling level in the chamber. A standard "up-side down" mixing procedure was used, with carbon black, silica, oil, and additive packages added first. The EPDM and POE were added last in the mixer. The peroxide curatives were added into the mix, when the compound temperature reached 65° C. The compound was finally dropped at 95° C. Mixing was completed on a two roll mill at a roll temperature 75° C. A compound blanket was sheeted out to be used for further testing. Each compound sheet (uncured) had a thickness of about 3 mm.

TABLE 2

Materials

| Grade | Chemical name | Characteristic | Supplier |
|---|---|---|---|
| EPDM 15A | EPDM (Ethylene/propylene/-diene terpolymer) | Mooney viscosity (ML1 + 4 @ 125° C.) = 87; C2 wt % 49; ENB wt % 4.9; Density (g/cc) 0.860, V0.1/V100 (each visc. at 190° C.) = 32 | Dow Chemical |
| KEP 110 | EPM (Ethylene-propylene copolymer) | Mooney viscosity (ML1 + 4 @ 125° C.) = 27; C2 wt % 52; Density (g/cc) 0.860 | KUMHO POLYCHEM |

TABLE 2-continued

| | | Materials | |
|---|---|---|---|
| Grade | Chemical name | Characteristic | Supplier |
| ENGAGE HM 7487 | POE (Ethylene-butene copolymer) | Mooney viscosity (ML1 + 4 @ 125° C.) = 41; Density (g/cc) 0.860 | Dow Chemical |
| ENGAGE 8180 | POE (Ethylene-octene copolymer) | Mooney viscosity (ML1 + 4 @ 125° C.) = 30; Density (g/cc) 0.863 | Dow Chemical |
| CB N550 | Carbon Black (CB) | Iodine Absorption Number, 43 g/kg; Oil Absorption No. [OAN] 121 cm$^3$/100 g | Cabot |
| CB N990 | Carbon Black (CB) | Oil Absorption No. [OAN] 38 cm$^3$/100 g | Cabot |
| Silica VN3 | Silica | Precipitated Silica | Evonik |
| A-172NT | vinyl tris (2 methoxy-ethoxy) silane | Silica coupling agent | Momentive Performance Materials Inc. |
| SUNPAR 2280 | Processing oil | Processing oil | SUNOCO |
| NAUGARD 445 | 4,4'-Bis (α,α-dimethyl-benzyl) diphenylamine | Hindered amine antioxidant | Addivant |
| MMBI | methylmercaptobenzimidazole | Amine type antioxidant | Lanxess |
| TMQ | Polymerized 2,2,4-trimethyl-1,2-dihydroquinoline | Amine type antioxidant | Lanxess |
| 1010 | Pentaerythritol tetrakis(3-(3,5-di-tert-butyl-4-hydroxyphenyl)-propionate) | Hindered phenol antioxidant | BASF |
| 168 | Tris(2,4-ditert-butylphenyl) phosphite | Phosphite antioxidant | BASF |
| SP150 | MgO | Acid scavenger | Rhechemie |
| AFLUX 42 | Fatty acid derivatives | Processing aid | Lanxess |
| PEG 8000 | Polyethylene glycols | Processing aid | Dow Chemical |
| LUPEROX F40P | 1,3(4)-bis(tert-butylperoxyiso-propyl)benzene, bisperoxide | Peroxide | Arkema |
| TAIC | Triallyl isocyanurate | Crosslink coagent | SCRC |

TABLE 3

| | | Formulations | | | |
|---|---|---|---|---|---|
| | | Comp. Ex. A | Comp. Ex. B | Comp. Ex. C | Comp. Ex. D |
| EPDM 15A | phr | 100 | | | |
| ENGAGE HM 7487 | phr | | 100 | | |
| ENGAGE 8180 | phr | | | 100 | |
| KEP 110 | phr | | | | 100 |
| CB N550 | phr | 25 | 25 | 25 | 25 |
| CB N990 | phr | 25 | 25 | 25 | 25 |
| Silica VN3 | phr | 20 | 20 | 20 | 20 |
| A-172NT (50%) | phr | 3.2 | 3.2 | 3.2 | 3.2 |
| SUNPAR 2280 | phr | 25 | 25 | 25 | 25 |
| NAUGARD 445 | phr | 1.5 | 1.5 | 1.5 | 1.5 |
| MMBI | phr | 1 | 1 | 1 | 1 |
| TMQ | phr | 1 | 1 | 1 | 1 |
| MgO (98%) | phr | 10 | 10 | 10 | 10 |
| AFLUX 42 | phr | 1 | 1 | 1 | 1 |
| PEG 8000 | phr | 2 | 2 | 2 | 2 |
| LUPEROX F40P (40%) | phr | 10 | 10 | 10 | 10 |
| TAIC | phr | 2 | 2 | 2 | 2 |
| Total | parts | 226.7 | 226.7 | 226.7 | 226.7 |

TABLE 4

| | | Formulations | | | | |
|---|---|---|---|---|---|---|
| | | Inv. Ex. 1' | Comp. E | Comp. F | Inv. Ex. 2' | Inv. Ex. 3' |
| EPDM 15A | phr | 80 | 50 | 50 | 50 | 50 |
| ENGAGE 8180 | phr | 20 | 50 | 50 | 50 | 50 |
| CB N550 | phr | 25 | 25 | 25 | 25 | 25 |
| CB N990 | phr | 25 | 25 | 25 | 25 | 25 |
| Silica VN3 | phr | 20 | 20 | 20 | 20 | 20 |
| A-172NT (50%) | phr | 3.2 | 3.2 | 3.2 | 3.2 | 3.2 |
| SUNPAR 2280 | phr | 25 | 25 | 25 | 25 | 25 |
| NAUGARD 445 | phr | 1.5 | 0 | 1.5 | 1.5 | 0.5 |
| MMBI | phr | 1 | 1 | 1 | 1 | 1 |
| TMQ | phr | 1 | 0 | 1 | 1 | 1 |
| 1010/168 50%/50% | phr | | 2.5 | | | |
| MgO (98%) | phr | 10 | 10 | 0 | 2 | 10 |
| AFLUX 42 | phr | 1 | 1 | 1 | 1 | 1 |
| PEG 8000 | phr | 2 | 2 | 2 | 2 | 2 |
| LUPEROX F40P (40%) | phr | 10 | 10 | 10 | 10 | 10 |
| TAIC | phr | 2 | 2 | 2 | 2 | 2 |
| Total | parts | 226.7 | 226.7 | 216.7 | 218.7 | 225.7 |

TABLE 5

| | | Formulations | | | |
|---|---|---|---|---|---|
| | | Inv. Ex. 4 | Inv. Ex. 5 | Inv. Ex. 6 | Inv. Ex. 7 |
| EPDM 15A | phr | 50 | 40 | 50 | 50 |
| ENGAGE 7487 | phr | 50 | 60 | | |
| ENGAGE 8180 | phr | | | 50 | 50 |
| CB N550 | phr | 25 | 45 | 25 | 45 |
| CB N990 | phr | 25 | 25 | 25 | 25 |
| Silica VN3 | phr | 20 | | 20 | |
| Vinyl Silane A-172NT (50%) | phr | 3.2 | | 3.2 | |
| SUNPAR 2280 | phr | 25 | 25 | 25 | 25 |
| NAUGARD 445 | phr | 1.5 | 1.5 | 1.5 | 1.5 |
| MMBI | phr | 1 | 1 | 1 | 1 |
| TMQ | phr | 1 | 1 | 1 | 1 |
| MgO (98%) | phr | 10 | 10 | 10 | 10 |
| AFLUX 42 | phr | 1 | 1 | 1 | 1 |
| PEG 8000 | phr | 2 | 2 | 2 | 2 |

TABLE 5-continued

| | | Formulations | | | |
|---|---|---|---|---|---|
| | | Inv. Ex. 4 | Inv. Ex. 5 | Inv. Ex. 6 | Inv. Ex. 7 |
| LUPEROX F40P | phr | 10 | 10 | 10 | 10 |
| TAIC | phr | 2 | 2 | 2 | 2 |
| Total Phr | parts | 226.7 | 223.5 | 226.7 | 223.5 |

Properties of the Formulations (Before Curing)

The Mooney viscosity of each formulated composition was measured using a sample take from an uncured compound sheet, so that the viscosity of the uncured composition could be examined. Mooney Viscosity (ML1+4 at 100° C.) was measured in accordance with ASTM 1646, with a one minute preheat time, and a four minutes rotor operation time. The instrument was a Prescott Mooney Viscometer. The results are shown in the Tables 6-8 below.

TABLE 6

| | Comp. Ex. A | Comp. Ex. B | Comp. Ex. C | Comp. Ex. D |
|---|---|---|---|---|
| ML (1 + 4), 100° C. | 90.8 | 66.1 | 48.0 | 47.4 |

TABLE 7

| | Inv. Ex. 1' | Com. Ex. E | Comp. Ex. F | Inv. Ex. 2' | Inv. Ex. 3' |
|---|---|---|---|---|---|
| ML (1 + 4), 100° C. | 83.6 | 71.2 | 63.8 | 65.0 | 69.7 |

TABLE 8

| | Inv. Ex. 4 | Inv. Ex. 5 | Inv. Ex. 6 | Inv. Ex. 7 |
|---|---|---|---|---|
| ML (1 + 4), 100° C. | 80.6 | 70.4 | 70.4 | 62.6 |

Physical Properties of the Vulcanizates
Preparation of the Test Specimens

The physical properties of the formulations were measured from vulcanized sheets, which were cured in a compression molder (Carver Model CMV100H-20-BPX). Samples from the uncured blankets were cut, heated and cured in the compression molder to make test specimens at approximately 2 mm thickness in accordance with ASTM D3182. To vulcanize the samples, the samples were under minimum compression pressure of 3.5 MPa (500 psi) at 180° C. for 15 min. The molded plaques were removed from the mold and cooled down at room temperature. Samples were conditioned for 24 hours at room temperature, prior to testing.

The physical properties of the vulcanizates, formed from the comparative and inventive compositions, are listed in the Tables 9-11 below. Values are reported as the average of three to five test samples.

Tensile Stress—Strain

Tensile strength at break (TS), elongation at break (EB) and modulus were measured using specimens which were die cut, using a "dumbbell" shaped tensile die, having the dimensions described in ASTM D412. Three die cut specimens were cut from the compression molded plaques, which were prepared as described under the Compression Molding section.

Hot Air Aging

For hot air aging, an accelerating test at 180° C. was conducted. The specimens were subjected to air ventilated oven at 180° C. for 120 hours; these accelerated aging parameters provide an indication of the performance of the formulations at 150° C. for 1008 hours, in air. Then the specimens were taken out and conditioned at room temperature for about 24 hours before testing. Tensile properties (Tensile Strength, Elongation and Modulus) of the aged specimens were measured at room temperature, following the method ASTM D412. Better retentions of the Tensile Strength, Elongation and Modulus are the key indicators of good heat aging resistance.

Shore A Hardness

Shore A hardness was measured using stacked three die cut specimens. Three die cut specimens were cut from the compression molded plaques, which were prepared as described under the Compression Molding section. Shore A hardness properties were measured at room temperature and the 5 s value was recorded, following the method ASTM D2240.

Retraction at Low Temperatures (TR10)

Low temperature elasticity of the vulcanizates were measured according to ASTM D1329. The test was started from −70° C. at elongation 250%. The temperature rise was 1° C./min, and the temperature corresponding to a "10% retraction" of the specimen was recorded as the TR10.

TABLE 9

| | Comp. Ex. A | Comp. Ex. B | Comp. Ex. C | Comp. Ex. D |
|---|---|---|---|---|
| Initial Properties | | | | |
| Tensile Stress at Break (MPa) original | 8.9 | 10.5 | 11.4 | 8.4 |
| Tensile Strain at Break (%) original | 365 | 409 | 389 | 504 |
| Modulus (Secant 100%) (MPa) | 1.81 | 2.47 | 3.61 | 1.40 |
| Shore A (degree) | 60.0 | 67.6 | 75.2 | 56.6 |
| After 180° C./120 hours | | | | |
| Tensile Stress at Break (MPa) | 5.3 | 9.2 | 10.1 | 5.5 |
| Retained Tensile Stress at Break (%)* | 59.6 | 87.6 | 88.6 | 65.5 |
| Tensile Strain at Break (%) | 108 | 344 | 307 | 340 |
| Retained Tensile Strain at Break (%)* | 29.6 | 84.1 | 78.9 | 67.5 |
| Modulus (Secant 100%) (MPa) | 4.89 | 3.27 | 4.83 | 1.86 |
| Increase in Modulus (Secant 100%) (%)** | 170 | 32.4 | 33.8 | 32.9 |
| Shore A (degree) | 70.8 | 72.8 | 79.6 | 62.0 |
| Increase in Shore A (%)** | 18.0 | 7.7 | 5.9 | 8.7 |
| TR10 (° C.) | −42.8 | −33.1 | −28.6 | −43.8 |

*Retained value = [value after aging/original value] × 100.
**Increased value = [(value after aging − original value)/original value] × 100.

TABLE 10

|  | Inv. Ex. 1' | Comp. Ex. E | Comp. Ex. F | Inv. Ex. 2' | Inv. Ex. 3' |
|---|---|---|---|---|---|
| Initial Properties | | | | | |
| Tensile Stress at Break (MPa) original | 9.0 | 9.5 | 10.0 | 10.9 | 11.0 |
| Tensile Strain at Break (%) original | 392 | 273 | 365 | 360 | 290 |
| Modulus (Secant 100%) (MPa) | 1.84 | 3.22 | 2.34 | 2.46 | 3.24 |
| Shore A (degree) | 61.1 | 68.6 | 64.4 | 64.6 | 68.0 |
| After 180° C./120 h | | | | | |
| Tensile Stress at Break (MPa) | 5.9 | 3.1 | 5.6 | 6.8 | 8.0 |
| Retained Tensile Stress at Break (%)* | 65.6 | 32.6 | 56.0 | 62.4 | 72.7 |
| Tensile Strain at Break (%) | 123 | 44 | 102 | 138 | 155 |
| Retained Tensile Strain at Break (%)* | 31.4 | 16.1 | 27.9 | 38.3 | 53.4 |
| Modulus (Secant 100%) (MPa) | 4.85 | / | 5.51 | 4.93 | 5.15 |
| Increase in Modulus (Secant 100%) (%)** | 163.6 | / | 135.5 | 100.4 | 59.0 |
| Shore A (degree) | 73.1 | 82.3 | 76.1 | 76.0 | 77.0 |
| Increase in Shore A (%)** | 19.6 | 20.0 | 18.2 | 17.6 | 13.2 |

*Retained value = [value after aging/original value] × 100.
**Increased value = [(value after aging − original value)/original value] × 100.

TABLE 11

|  | Inv. Ex. 4 | Inv. Ex. 5 | Inv. Ex. 6 | Inv. Ex. 7 |
|---|---|---|---|---|
| Initial properties | | | | |
| Tensile Stress at Break (MPa) original | 11.0 | 10.4 | 10.2 | 10.7 |
| Tensile Strain at Break (%) original | 420 | 380 | 364 | 353 |
| Modulus (Secant 100%) (MPa) | 2.09 | 2.13 | 2.58 | 2.72 |
| Shore A (degree) | 63.6 | 62.7 | 67.0 | 64.6 |
| After 180° C./120 h | | | | |
| Tensile Stress at Break (MPa) | 7.7 | 9.1 | 7.6 | 7.8 |
| Retained Tensile Stress at Break (%)* | 70.0 | 87.5 | 74.5 | 72.9 |
| Tensile Strain at Break (%) | 193 | 295 | 173 | 199 |
| Retained Tensile Strain at Break (%)* | 46.0 | 77.6 | 47.5 | 56.4 |
| Modulus (Secant 100%) (MPa) | 3.97 | 3.36 | 4.64 | 4.36 |
| Increase in Modulus (Secant 100%) (%)** | 90.0 | 74.1 | 69.7 | 60.3 |
| Shore A (degree) | 72.0 | 67.5 | 75.0 | 73.6 |
| Increase in Shore A (%)** | 13.2 | 7.7 | 11.9 | 13.9 |
| TR10 (° C.) | −42.6 | −44.4 | −41.0 | −40.3 |

*Retained value = [value after aging/original value] × 100.
**Increased value = [(value after aging − original value)/original value] × 100.

SUMMARY OF THE RESULTS

The inventive examples 4-7 showed good original physical properties (preferred initial TS (Tensile Stress at Break) ≥10 MPa, and excellent heat aging resistance, as indicated by the fairly high retention of TS (preferred TS after heat aging ≥7.5 MPa), and EB (Tensile Strain at Break; preferred EB after heat aging ≥160%) after heat aging at 120 h/180° C. The high and low temperature elasticity was excellent, as indicated by the relatively low TR10 (preferred TR10≤−38° C.), as compared to the comparative examples.

As compared to the comparative examples, the inventive examples 1', 2', 3' showed good original physical properties (TS>9 MPa) and good heat aging resistance (retained tensile stress >60%; retained tensile strain >30%, although not as good as inventive examples 4-7.

Comparative example A was a baseline formulation with 100 phr EPDM. The heat aging performance is poor, as indicated by the low retained TS (<60%) and low retained EB (<30%) after aging. Comparative example B, based on 100 phr ENGAGE HM 7487, had excellent heat aging performance, but the TR10 was too high (>−38° C.). Comparative example C, based on 100 phr ENGAGE 8180, had excellent aging performance, but the TR10 was too higher (>−38° C.). Comparative example D, based on 100 phr EPM, had lower TS values (initial TS and after aging), compared to the inventive examples.

Compared to the inventive example 6, the comparative example E, based on 50 phr EPDM and 50 phr ENGAGE 8180, with 1010/168 (hindered phenol antioxidant)) as the major antioxidant package, had poor heat aging performance. Compared to the inventive example 6, the comparative example F, based on 50 phr EPDM and 50 phr ENGAGE 8180, without MgO, also had poor heat aging performance

What is claimed is:

1. A composition comprising the following components:
A) an ethylene/alpha-olefin/diene interpolymer with MV(1+4, 125° C.) ≥50;
B) an ethylene/alpha-olefin copolymer with MV(1+4, 125° C.)≤80;
C) MgO;
D) at least one carbon black filler;
E) at least one hindered amine antioxidant;
F) at least one peroxide, and
wherein the weight ratio of component C to component E is from 2.0 to 10, and wherein the weight ratio of component A to component B is from 0.4 to 3.0, and wherein the composition has a Tensile Strain at Break ≥300%.

2. The composition of claim 1, wherein the weight ratio of component D to component C is from 2.0 to 20.

3. The composition of claim 1, wherein the weight ratio of component A to component B is from 0.6 to 2.0.

4. The composition of claim 1, wherein the ethylene/alpha-olefin copolymer of component B has a density from 0.850 g/cc to 0.880 g/cc.

5. The composition of claim 1, wherein the sum weight of component A and component B is from 30 wt % to 70 wt %, based on the weight of the composition.

6. The composition of claim 1, wherein the alpha-olefin of the ethylene/alpha-olefin copolymer of component B is a C3-C10 alpha-olefin.

7. The composition of claim 1, wherein the MgO of component C is present in an amount from 0.5 to 10 wt %, based on the weight of the composition.

8. The composition of claim 1, wherein component E is present in an amount from 0.1 to 3.0 wt %, based on the weight of the composition.

9. The composition of claim 1, wherein the composition, after 120 hours at 180° C., in air, retains ≥45% of its original Tensile Strain at Break.

10. The composition of claim 1, wherein the composition, after 120 hours at 180° C., in air, has a TR10 value ≤−35° C.

11. An article comprising at least one component formed from the composition of claim 1.

12. A composition comprising the following components:
A) an ethylene/alpha-olefin/diene interpolymer with MV(1+4, 125° C.) ≥50;
B) an ethylene/alpha-olefin copolymer with MV(1+4, 125° C.)≤80;
C) MgO;
D) at least one carbon black filler;
E) at least one hindered amine antioxidant;
F) at least one peroxide, and
wherein the weight ratio of component D to component C is from 2.0 to 20, and wherein the composition has a Tensile Strain at Break ≥300%.

13. The composition of claim 12, wherein the weight ratio of component A to component B is from 0.2 to 4.0.

14. The composition of claim 12, wherein the weight ratio of component C to component E is from 1.0 to 10.

15. The composition of claim 12, wherein the composition, after 120 hours at 180° C., in air, retains ≥45% of its original Tensile Strain at Break.

16. The composition of claim 12, wherein the composition, after 120 hours at 180° C., in air, retains ≥60% of its original Tensile Stress at Break.

17. The composition of claim 12, wherein the composition, after 120 hours at 180° C., in air, has a TR10 value ≤−35° C.

18. An article comprising at least one component formed from the composition of claim 12.

* * * * *